(12) United States Patent
Guariento

(10) Patent No.: US 6,350,501 B1
(45) Date of Patent: Feb. 26, 2002

(54) SOLID AGGLOMERATE FOR COMPONENTS USED FOR CONSTRUCTION, DECORATION AND/OR NOVELTY ITEMS

(75) Inventor: Agostino Guariento, Montegrotto Terme (IT)

(73) Assignee: Interscambio S.r.l., Montegrotto Terme (IT)

(*) Notice: Subject to any disclaimer, the term of this patent is extended or adjusted under 35 U.S.C. 154(b) by 0 days.

(21) Appl. No.: 09/463,344

(22) PCT Filed: Jul. 27, 1998

(86) PCT No.: PCT/EP98/04697

§ 371 Date: Jan. 24, 2000

§ 102(e) Date: Jan. 24, 2000

(87) PCT Pub. No.: WO99/05075

PCT Pub. Date: Feb. 4, 1999

(30) Foreign Application Priority Data

Jul. 28, 1997 (IT) .......................... PD97A0171

(51) Int. Cl.[7] .............................................. B32B 3/14
(52) U.S. Cl. .......................................... 428/38; 428/220
(58) Field of Search .......................... 428/15, 38, 220

(56) References Cited

U.S. PATENT DOCUMENTS 3,407,165 A 10/1968 Oepkes et al.

FOREIGN PATENT DOCUMENTS

GB     A 2 164 289     3/1986
WO     A 89 11457     11/1989

OTHER PUBLICATIONS

Chemical Abstracts, vol. 115, No. 14, Oct. 7, 1991 Columbus, Ohio, US; abstract No. 141396p, H. Yamaguchi: p. 329; XP000318062 see abstract & JP 03 083842 A (ID.), 4/91.

Database WPI Week 9333 Derwent Publications Ltd., London, GB; AN 93–261505 XPOO2086262 & JP 05 178646 A (NGK Insulators et al.) see abstract.

Database WPI Week 9528 Derwent Publications Ltd., London, GB; AN 95–213136 XPOO2086263 & JP 07 126504 A (Sekisui Chem Ind) see abstract.

Database WPI Week 9502 Derwent Publications Ltd., London, GB; AN 95–012020 XP002086264 & JP 06 299055 A (Sekisui Chem Ind) see abstract.

Chemical Abstracts, vol. 116, No. 8, Feb. 24, 1992 Columbus, Ohio, US: abstract No. 65823d, K. Tanaka et al.: p. 408, XP000375434 see abstract & JP 03 197373 A (ID.) 2/1992.

*Primary Examiner*—Alexander S. Thomas
(74) *Attorney, Agent, or Firm*—Guido Modiano; Albert Josif; Daniel O'Byrne

(57) ABSTRACT

A solid agglomerate for components used for building, interior decoration or the like which comprises a combination of granular inert materials such as marble, granite or similar, binding resin and granular glass in a quantity, quality and piece size such that light can pass between opposite parts of the solid.

10 Claims, 1 Drawing Sheet

SOLID AGGLOMERATE FOR COMPONENTS USED FOR CONSTRUCTION, DECORATION AND/OR NOVELTY ITEMS

BACKGROUND OF THE INVENTION

The present invention relates to a solid agglomerate for components used for construction, decoration and/or novelty items.

So-called "Venetian terrazzo" or marble gravel is widely known in the construction sector and has recently regained popularity in the production of paving.

Venetian terrazzo is currently manufactured by several firms mainly for producing pavings, indoor and outdoor claddings, with tiles which are merely solid agglomerates of marble chips and of a binding agent which is usually constituted by a polyester resin.

Depending on the type and color of the marble used, corresponding effects are obtained in the appearance of the tile and accordingly of the entire paving or cladding.

Artificial stone manufacturing is widely known also, as disclosed, for example, in the document WO 89/11457.

It is also known that statutory provisions soon to be enforced, related to building safety, prescribe the mandatory installation of safety luminaires no longer on walls but in the floor.

This entails rather significant technical repercussions if it is necessary to embed the luminaires in pavings without causing alterations to their appearance while complying with statutory provisions.

SUMMARY OF THE INVENTION

The aim of the present invention is to provide a new solid agglomerate for building components which allows to broaden the possibilities of producing pavings, claddings, stairways, etcetera.

Within the scope of this aim, a consequent primary object is to provide a solid agglomerate which is capable of complying with the new statutory provisions related to the safety lighting of buildings without altering in any way the overall appearance of the paving or cladding.

Another important object is to provide a solid agglomerate which can conveniently be used also to produce kitchen surfaces, bar counters, tables, ceiling lamps and other interior decoration components and/or novelty items for gifts, such as containers, vases, etcetera.

Another important object is to provide an agglomerate which has a good structural strength, at least equal to that of agglomerates currently used in the production of pavings and claddings of the Venetian terrazzo type.

Another object is to provide a solid agglomerate which can be produced or manufactured with conventional equipment and plants at competitive costs.

This aim, these objects and others which will become apparent hereinafter are achieved by a solid agglomerate for components used for building, interior decoration and/or novelty items, according to the invention and having features set forth in claim 1.

Advantageously, the granular quantity of colored and clear glass is between approximately 5% and approximately 50% by weight, as a function of the lighting effect and of the cost to be obtained for the finished product, while the sum of the amount of resin and the granular inert materials such as marble, granite or similar is the remainder up to 100%.

Conveniently, the amount by weight of the resin is approximately 5–6% of the total.

BRIEF DESCRIPTION OF THE DRAWINGS

Further characteristics and advantages of the invention will become apparent from the detailed description of an embodiment thereof, illustrated only by way of non-limitative example in the accompanying drawings, wherein.

DESCRIPTION OF THE PREFERRED EMBODIMENTS

Figure 1:
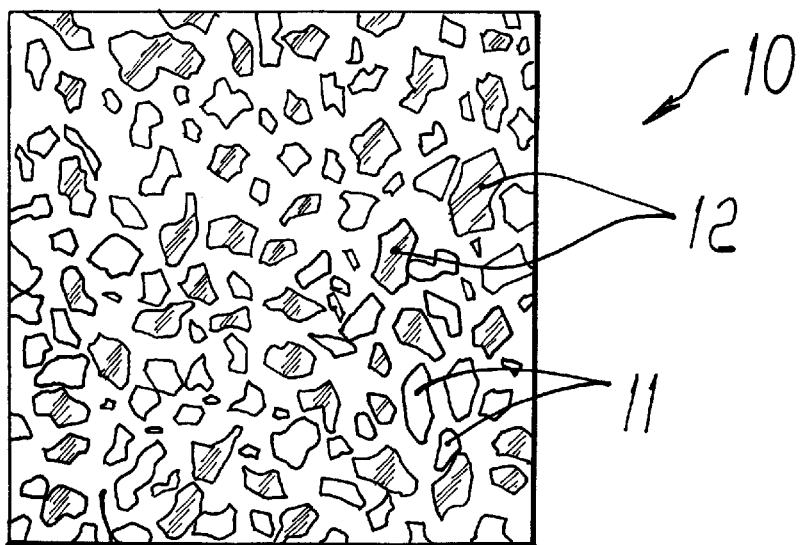
FIG. 1 is a plan view of a tile with the structure according to the invention.

With reference to the above figures, in a preferred but not exclusive embodiment the solid agglomerate has the configuration, for example, of a paving tile, designated by the reference numeral 10, and is therefore shaped like a flat solid which contains granular marble or similar 11 and granular glass 12 which are bonded by a single- or two-component polyester resin 13.

Figure 2:
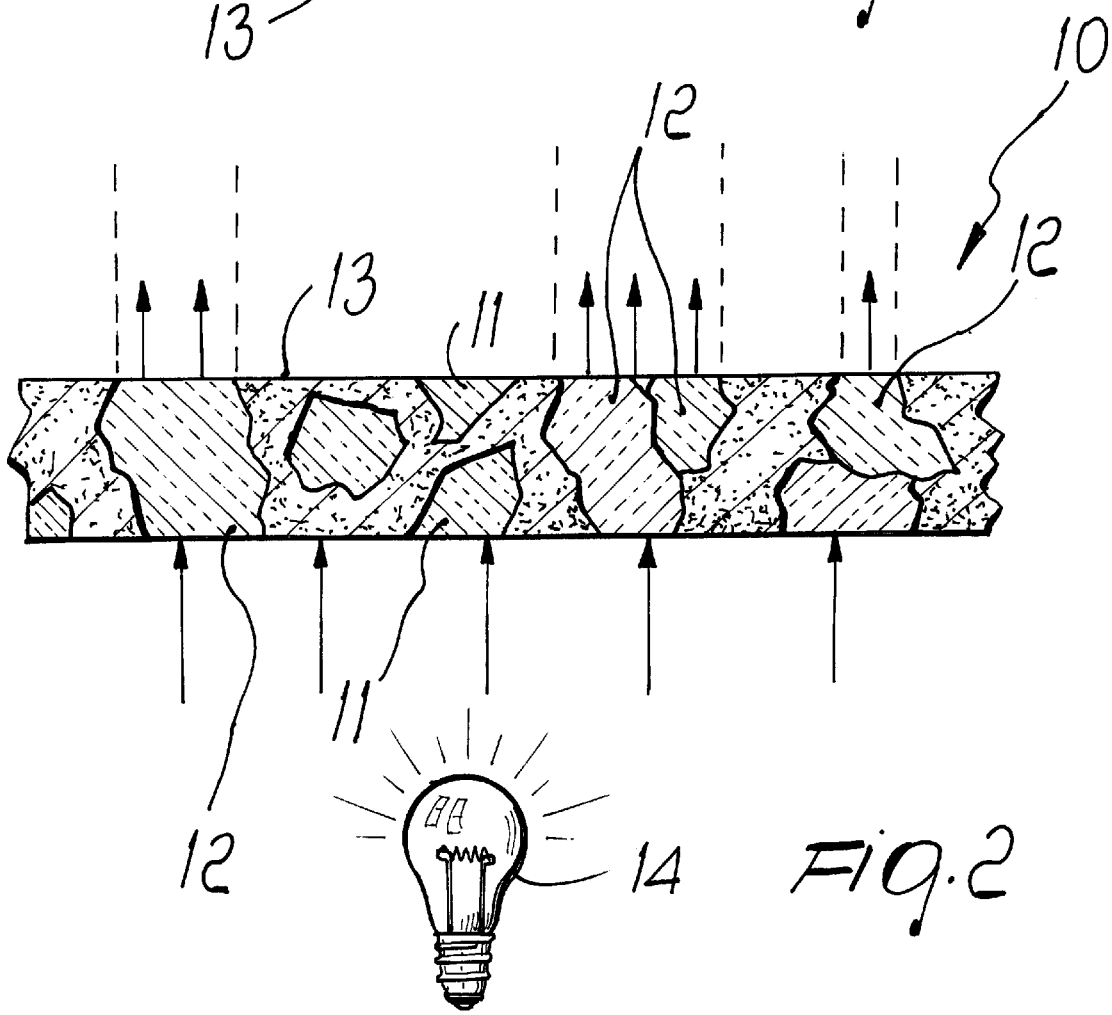
FIG. 2 is a sectional view of a detail of the tile of FIG. 1.

The quantity, quality and piece size of the colored or clear granular glass 12 are such that light can pass between opposite faces of the tile 10, as shown in FIG. 2.

The piece size of the granular marble or similar 11 and of the granular glass 12 must be a function of the thickness of the slab to be obtained.

The binding resin 13 can conveniently be provided in various colors.

As regards quantities, the granular glass 12 is preferably approximately 25–30% by weight of the total, the resin 13 is approximately 5–6% and the granular marble or similar 11 is the remaining quantity required to reach 100%.

The amount of granular glass can in any case vary between 5 and 50%.

The tiles 10, or in any case the geometric solids, are produced with thickness up to a maximum of approximately 3–4 cm.

It is also possible to produce blocks of various dimensions to be reduced to slabs with the above cited thickness.

In the production of the block, it is possible to modify the piece sizes of the glass and of the marble to a maximum piece size of 10 cm.

The surfaces, particularly the exposed one, are accurately polished and optionally puttied in order to fully remove any protruding points or sharp edges of the granular glass 12, so as to avoid hazards for the users.

The fact that light can pass between opposite faces of the tile 10 allows to use said tile for indoor flooring, for outdoor paving and for indoor and outdoor claddings, with the function of also acting as a screen for a luminaire (represented by the light bulb 14 of FIG. 2). As a screen, the tile fully conceals the luminaire when the latter emits no light, but thanks to its structural characteristics, when the luminaire is supplied with power, the screen allows the luminaire to perform its function, which can be in particular a safety function, for example in steps or risers of stairways or corridors, etcetera, an aesthetic function, or a signaling function if giving a particular effect to the paving is sought.

The agglomerate can also be provided in the form of slabs for construction and interior decoration, for example for surfaces of modular kitchens, bar counters, tables, baseboards, friezes, etcetera or also for interior decoration accessories, such as ceiling lamps, and for gift novelty items such as containers of various shapes and sizes.

In practice it has been observed that the intended aim and objects of the present invention have been achieved.

A solid agglomerate has in fact been provided which while having the appearance of typical Venetian terrazzo has a particular internal structure which allows to transmit light between the two opposite surfaces thereof. This feature offers considerable possibilities of application and construction particularly in the field of building safety.

The invention thus conceived is susceptible of numerous modifications and variations, all of which are within the scope of the claims.

All the details may furthermore be replaced with other technically equivalent elements.

In practice, the materials used, so long as they are compatible with the contingent use, as well as the dimensions, may be any according to requirements.

What is claimed is:

1. A solid agglomerate for building components, interior decoration and novelty items, made of a combination of elements, comprising:

a binding resin; and granular coloured or clear glass; and granular inert material;

wherein the granular inert material is selected from a group including marble, granite and construction inert materials combinable in discrete piece form; and wherein said granular glass is constituted by discrete pieces in quantities and with piece sizes selected as a function of the agglomerate thickness to provide a plurality of glass light paths constituted each by at least one glass piece through which light rays propagate between opposite surfaces of the agglomerate.

2. A solid agglomerate according to claim 1, wherein said granular glass is present in an amount between approximately 5% and approximately 50% by weight and in that the sum of the remaining components is such as to reach 100%.

3. A solid agglomerate according to claim 2, wherein said granular glass is present in an amount between approximately 5% and approximately 50% by weight, said resin is present in an amount of approximately 5–6% by weight, and the granular inert materials are constituted by marble present in the remaining amount required to reach 100%.

4. A solid agglomerate according to claim 1, wherein said resin is a single- or two-component polyester resin.

5. A solid agglomerate according to claim 1, wherein it is provided in the form of tiles or slabs with thickness of up to approximately 3–4 cm.

6. A solid agglomerate according to claim 5, wherein the granular glass is present in a preferred amount of 25–30% by weight of the total, the resin is present in an amount of 5–6% by weight and the remaining components being constituted by inert material.

7. A solid agglomerate according to claim 6, wherein the discrete glass pieces have sizes in the order of several millimeters up to a maximum size of 10 cm for distributing in the mass of the agglomerate so as to provide said light paths.

8. A solid agglomerate according to claim 1, wherein it is in the form of blocks to be cut into slabs with thickness up to approximately 3–4 cm.

9. Building components, interior decoration and novelty items made of a solid agglomerate as defined in claim 1, which are adapted to allow propagation of artificial light rays therethrough for safety and aesthetic and signaling lighting purposes.

10. A process for manufacturing a solid agglomerate, as set forth in claim 1, for building components, interior decoration and novelty items, comprising the steps of:

providing a binding resin;

providing granular inert materials selected from a group including marble, granite and construction granular inert materials, combinable in discrete piece form;

providing granular colored and clear glass in discrete pieces; and combining the resin and the inert materials with the pieces of glass provided in quantities and with piece sizes selected as a function of the agglomerate thickness for obtaining the agglomerate with a plurality of glass light paths therethrough, each said light path being constituted by at least one glass piece through which light rays propagate between opposite surfaces of the agglomerate.

* * * * *